United States Patent [19]

Brunner et al.

[11] Patent Number: 4,650,601
[45] Date of Patent: Mar. 17, 1987

[54] CASSETTE DISPLAY WINDOW

[75] Inventors: Hubert Brunner, Weil; August Liepold, Munich, both of Fed. Rep. of Germany

[73] Assignee: Agfa Gevaert Aktiengesellschaft, Leverkusen, Fed. Rep. of Germany

[21] Appl. No.: 851,976

[22] Filed: Apr. 14, 1986

[30] Foreign Application Priority Data

Apr. 25, 1985 [DE] Fed. Rep. of Germany ....... 3514967

[51] Int. Cl.$^4$ .......................... C08K 5/00; G03B 1/04; C09K 11/02
[52] U.S. Cl. ............................... 252/301.35; 215/365; 215/366; 242/199; 252/301.16
[58] Field of Search ...................... 252/301.35, 301.16, 252/483.1; 215/365, 366; 242/199

[56] References Cited

U.S. PATENT DOCUMENTS

| | | | |
|---|---|---|---|
| 2,937,818 | 5/1960 | Zorn | 242/199 |
| 3,115,417 | 12/1983 | Christensen | 252/301.35 |
| 3,116,256 | 12/1963 | D'Alelio et al. | 252/301.35 |
| 3,718,290 | 2/1973 | Wright | 242/199 |
| 4,486,587 | 12/1984 | Seybold | 252/301.16 |
| 4,492,648 | 1/1985 | Claussen et al. | 252/301.35 |
| 4,492,778 | 1/1985 | Clausen et al. | 252/301.35 |
| 4,526,705 | 7/1985 | Arndt et al. | 252/301.16 |
| 4,544,490 | 10/1985 | Claussen et al. | 252/301.16 |

*Primary Examiner*—Arthur P. Demers
*Attorney, Agent, or Firm*—Connolly and Hutz

[57] ABSTRACT

A magnetic tape cassette, consisting of opaque plastics material, contains, according to the invention, a display window with a scale impressed therein, consisting of transparent plastics material as well as one or more fluorescent plastics materials finely-divided therein, the ratio between the light emission surface area and the light absorption surface area of the display window being from 1:10 to 1:2000.

5 Claims, No Drawings

CASSETTE DISPLAY WINDOW

This invention relates to cassettes for magnetic tapes with an opaque housing and at least one display window with scale divisions.

So as to be able to control the position of the tape from the outside on the right-hand and/or left-hand spool of cassettes for magnetic tape apparatus, for example compact cassettes or video cassettes, it is known to apply display windows consisting of transparent plastics material both in the cassette and in the playing apparatus.

In compact cassettes, the display window is generally on both sides, that is in front and behind in the centre of two flangeless spools, a scale being impressed below the display window into the cassette material. With video cassettes, the display window, depending on the system, is found on one or both sides of one or both halves of the cassette, and the scale is generally impressed in the window, which is semicircular or circular. These known embodiments suffer from the disadvantage that the scale is extremely difficult to see both on compact cassettes and video cassettes, particularly in unfavourable light conditions.

The object of the invention is to remove this disadvantage of bad visibility of the scale or other markings on the display window.

This object is achieved according to the invention with cassettes for magnetic tapes having an opaque housing and at least one display window with the scale divisions, the display window consisting of a transparent light-collecting panel which contains fluorescent dyes and the ratio of the light emission surface area to the absorption surface area is from 1:10 to 1:2000.

Details of the invention can be found in the subclaims and the description.

With the cassette according to the invention, an excellent visibility of the scale or other markings impressed in the display window is produced even in unfavourable lighting conditions. The visibility is created by the light captured in the display window being absorbed in finely-divided fluorescent materials in the transparent plastics material, a large proportion of the emitted fluorescent light on the exterior surfaces of the display window being totally reflected back into the interior, such that light emission can only take place at those positions where the angle of impact on the exterior surface drops below the critical angle of the total reflection, as, for example, on impressed or raised markings or on printed places. The brightness contrast in relation to a display window which has none of the above-described light-collecting properties, is thereby substantially increased. The visibility of the scale can be still further increased by coating the impressed positions with metal on the reverse side or covering them with a dispersive medium, for example $TiO_2$ powder.

It is crucial in the selection of the material for the display window and the fluorescent dyes distributed therein, that the diffused light falling into the display window is absorbed by the fluorescent material with a high quantum yield and the greater part of the emitted fluorescent light is totally reflected in the display window, with as little loss as possible, that is substantially free from absorption and light emission, and only emerges at the impressed places or at the edges. The loss factor V of the light not totally reflected is calculated from the formula $$V = 1 - \sqrt{\frac{n^2 - 1}{n}}.$$

For plastics material with the refraction index $n=1.49$, the loss factor is $V=25\%$. This means that 75% of the fluorescent light is totally reflected in the display window.

The "brightness enhancing factor", that is the factor which gives the increase in the luminance of the emission surfaces in the visual display panel in relation to the luminance of a coat of the same fluorescent material as contained in the display window, is substantially given by the ratio of the emission surface area of the fluorescent light to the light-absorbing surface area of the visual display panel, this ratio according to the invention being from 1:10 to 1:2000.

There are a large number of materials which are suitable as material for the transparent display window, for example polystyrene, mixed polymer of polystyrene with butadiene and acrylonitrile or acrylic esters, hard PVC, cellulose ester, polymethyl methacrylate, polymethyl acrylate, polydiethylene glycol-diallyl-biscarbonate, polyamide or polycarbonate. Fluorescent materials can be introduced into these plastics materials in known manner in a finely-divided form.

Fluorescent dyes which are suitable for use in the cassette with the display window according to the invention must fulfil the condition of light-permanence. Such fluorescent dyes have become known in recent years from numerous publications, for example EP No. 4 655, EP No. 33 079, EP No. 46 164, EP No. 46 861, EP No. 73 007, EP No. 77 496 and DE-OS No. 24 51 782, DE-OS No. 28 15 031, DE-OS No. 28 51 513, DE-OS No. 29 34 541, DE-OS No. 29 52 228, DE-OS No. 30 01 877, DE-OS No. 31 10 959, DE-OS No. 31 36 894, DE-OS No. 31 49 620, DE-OS No. 32 35 526.

Suitable for use in the display window according to the invention are all light-fast fluorescent dyes in which the emission band of emitted light is substantially free from absorption in the display window. Mixtures of fluorescent dyes can also be used if they fulfil the above condition, likewise, fluorescent dyes can be mixed with dyes which do not fluoresce.

Further advantages of the cassette with the display window according to the invention are that the display window is simple to produce without any change in design. All those skilled in the art of plastics materials know that the above-moulded plastics materials which are obtainable as granulate, can be very easily processed in injection moulds to display windows.

When comparing two compact cassettes, one of which has a light-collecting display window according to the invention, which contains fluorescent dyes, while the other cassette has a known transparent display window, the substantially improved visibility of the scale on the display window according to the invention can be clearly recognised.

We claim:
1. A cassette for magnetic tapes having an opaque housing and at least one display window with scale divisions, characterised in that the display window consists of a transparent light-collecting panel, which contains fluorescent dyes and the ratio of which of the light emission surface area to the absorption surface area is from 1:10 to 1:2000.

2. A cassette according to claim 1, characterised in that the transparent material consists of polystyrene, polystyrene with butadiene and acrylonitrile or acrylic esters, hard PVC, cellulose ester, polymethyl methacrylate, polymethyl acrylate, polydiethylenediallyl-biscarbonate, polyamide or polycarbonate, in which one or more fluorescent dyes emitting in the visible spectral region, are contained in finely-divided form, the emitted light of which is substantially totally reflected in the light-collecting panel, and only slightly absorbed.

3. A cassette according to claim 1, characterised in that a mixture of fluorescent and non-fluorescent dyes is contained in the transparent display window.

4. A cassette according to claim 1, characterised in that the scale division in the display window is produced by impressing or printing.

5. A cassette according to claim 1, characterised in that the impressed scale division is coated with metal on the reverse side or is covered with a dispersive medium.

* * * * *